United States Patent
Barnes et al.

(10) Patent No.: US 11,780,170 B2
(45) Date of Patent: Oct. 10, 2023

(54) FUSING THREE DIMENSIONAL (3D) PARTS (71) Applicant: Hewlett-Packard Development Company, L.P., Spring, TX (US)

(72) Inventors: Arthur H. Barnes, Vancouver, WA (US); Michael Ewe, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 501 days.

(21) Appl. No.: 16/637,663

(22) PCT Filed: May 29, 2018

(86) PCT No.: PCT/US2018/034841
§ 371 (c)(1),
(2) Date: Feb. 7, 2020

(87) PCT Pub. No.: WO2019/231431
PCT Pub. Date: Dec. 5, 2019

(65) Prior Publication Data
US 2021/0146625 A1 May 20, 2021

(51) Int. Cl.
*B29C 64/165* (2017.01)
*B29C 64/393* (2017.01)
(Continued)

(52) U.S. Cl.
CPC ............ *B29C 64/393* (2017.08); *B22F 10/14* (2021.01); *B22F 10/36* (2021.01); *B22F 10/40* (2021.01); *B22F 12/90* (2021.01); *B29C 64/165* (2017.08); *B33Y 10/00* (2014.12); *B33Y 30/00* (2014.12); *B33Y 50/02* (2014.12); *B22F 12/55* (2021.01)

(58) Field of Classification Search
CPC ..... B29C 64/393; B29C 64/165; B29C 64/40; B33Y 50/02; B33Y 10/00; G01J 5/024
See application file for complete search history.

(56) References Cited

U.S. PATENT DOCUMENTS 5,262,000 A * 11/1993 Welbourn ............ H01H 1/0036
216/101
8,137,739 B2 3/2012 Philippi et al.
(Continued)

FOREIGN PATENT DOCUMENTS

CN 106794605 A 5/2017
CN 107646143 A 1/2018
(Continued)

*Primary Examiner* — Joseph S Del Sole
*Assistant Examiner* — Margaret B Hayes
(74) *Attorney, Agent, or Firm* — SHOOK, HARDY & BACON L.L.P.

(57) ABSTRACT

In an example implementation, a method of fusing layers of 3D parts includes forming a layer of build material, and selectively applying a liquid agent onto the layer of build material to define a part layer of a 3D part and a sacrificial layer of a sacrificial part. The method includes, in a single pass of a thermal energy source over the layer of build material, applying fusing energy to the sacrificial layer, sensing a temperature of the sacrificial layer, adjusting a power level of the thermal energy source based on the sensed temperature, and applying fusing energy to the part layer with the adjusted power level of the thermal energy source.

15 Claims, 6 Drawing Sheets

(51) Int. Cl.
*B33Y 10/00* (2015.01)
*B33Y 30/00* (2015.01)
*B33Y 50/02* (2015.01)
*B22F 10/14* (2021.01)
*B22F 12/90* (2021.01)
*B22F 10/40* (2021.01)
*B22F 10/36* (2021.01)
*B22F 12/55* (2021.01)

(56) References Cited

U.S. PATENT DOCUMENTS

| | | | | |
|---|---|---|---|---|
| 10,807,305 | B2* | 10/2020 | Zhao | B29C 64/393 |
| 2004/0200816 | A1* | 10/2004 | Chung | G05D 23/1919 |
| | | | | 219/121.83 |
| 2010/0327479 | A1* | 12/2010 | Zinniel | B29C 64/106 |
| | | | | 425/114 |
| 2013/0011562 | A1* | 1/2013 | Varanka | B33Y 10/00 |
| | | | | 427/289 |
| 2013/0078013 | A1 | 3/2013 | Chillscyzn et al. | |
| 2013/0186514 | A1 | 7/2013 | Zhuang | |
| 2014/0265046 | A1 | 9/2014 | Burris et al. | |
| 2015/0021815 | A1* | 1/2015 | Albrecht | B23K 9/23 |
| | | | | 425/162 |
| 2015/0190965 | A1* | 7/2015 | Okamoto | C09D 11/322 |
| | | | | 264/401 |
| 2015/0314528 | A1* | 11/2015 | Gordon | B29C 64/118 |
| | | | | 264/401 |
| 2016/0122541 | A1* | 5/2016 | Jaker | B29C 64/106 |
| | | | | 525/392 |
| 2016/0193696 | A1 | 7/2016 | Mcfarland et al. | |
| 2017/0072463 | A1* | 3/2017 | Ng | B29C 70/00 |
| 2017/0151722 | A1* | 6/2017 | Prasad | B29C 64/165 |
| 2017/0173694 | A1* | 6/2017 | Myerberg | B22F 12/53 |
| 2017/0239891 | A1 | 8/2017 | Buller | |
| 2017/0334139 | A1 | 11/2017 | Ammi | |
| 2018/0111320 | A1* | 4/2018 | Zhao | G05B 19/4099 |
| 2019/0323901 | A1* | 10/2019 | Mori | G01K 7/22 |
| 2021/0160439 | A1* | 5/2021 | Hosaka | G01J 5/0806 |

FOREIGN PATENT DOCUMENTS

| | | | | |
|---|---|---|---|---|
| CN | 108025501 A | | 5/2018 | |
| EP | 2263861 A1 | | 12/2010 | |
| EP | 3178588 A2 | | 6/2017 | |
| EP | 3668702 A1 | | 6/2020 | |
| JP | 2002292748 A | | 10/2002 | |
| WO | WO-2016195664 A1 | | 12/2016 | |
| WO | WO-2016195665 A1 | * | 12/2016 | B29C 64/165 |

* cited by examiner

| 142↘ | MP1 | MP2 | MP3 | MP4 | MP5 |
|---|---|---|---|---|---|
| TTM1 | 210 | 202 | 195 | 190 | 184 |
| TTM2 | 205 | 199 | 192 | 187 | 181 |
| TTM3 | 201 | 193 | 187 | 182 | 176 |
| TTM4 | 198 | 190 | 183 | 178 | 172 |
| TTM5 | 191 | 183 | 176 | 171 | 165 |

FUSING THREE DIMENSIONAL (3D) PARTS

BACKGROUND

Additive manufacturing processes can produce three-dimensional (3D) objects by providing a layer-by-layer accumulation and solidification of build material patterned from digital 3D object models. In some examples, inkjet printheads can selectively print (i.e., deposit) liquid functional agents such as fusing agents or binder liquids onto layers of build material in areas of each layer that are to form layers of a 3D object. The liquid agents can facilitate the solidification of the build material within the printed areas. For example, fusing energy can be applied to a layer to thermally fuse together build material in areas where a liquid fusing agent has been printed. The solidification of the printed regions of build material can form 2D cross-sectional layers of the 3D object being produced, or printed.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

In some additive manufacturing processes, such as some 3D printing processes, for example, 3D objects or parts can be formed on a layer-by-layer basis where each layer is processed and portions thereof are combined with subsequent layers until the 3D object is fully formed. Throughout this description, the terms 'part' and 'object' and their variants may be used interchangeably. Furthermore, while build material is generally referred to herein as being powdered build material, such as powdered nylon, there is no intent to limit the form or type of build material that may be used when producing a 3D object from a 3D digital object model. Various forms and types of build materials may be appropriate and are contemplated herein. Examples of different forms and types of build materials can include, but are not limited to, short fibers that have been cut into short lengths or otherwise formed from long strands or threads of material, and various powder and powder-like materials including plastics, ceramics, metals, and the like. In some examples, a suitable build material can include PA12 build material commercially known as V1R10A "HP PA12" available from HP Inc.

In various 3D printing processes, layers of a 3D object being produced can be patterned from 2D slices of a digital 3D object model, where each 2D slice defines portions of a powder layer that are to form a layer of the 3D object. Information in a 3D object model, such as geometric information that describes the shape of the 3D model, can be stored as plain text or binary data in various 3D file formats, such as STL, VRML, OBJ, FBX, COLLADA, 3MF, and so on. Some 3D file formats can store additional information about 3D object models, such as information indicating colors, textures and/or surface finishes, material types, and mechanical properties and tolerances.

The information in a 3D object model can define solid portions of a 3D object to be printed or produced. In some examples, a 3D object can comprise a sacrificial part, as discussed below. To produce a 3D object from a 3D object model, the 3D model information can be processed to provide 2D planes or slices of the 3D model. In different examples, 3D printers can receive and process 3D object models into 2D slices, or they can receive 2D slices that have already been processed from 3D object models. Each 2D slice generally comprises an image and/or data that can define an area or areas of a build material layer (e.g., powder) as being solid part areas where the powder is to be solidified during a 3D printing process. Thus, a 2D slice of a 3D object model can define part layers and sacrificial part layers as areas of a powder layer that are to receive (i.e., be printed with) a liquid functional agent such as a fusing agent. Conversely, areas of a powder layer that are not defined as part areas by a 2D slice, comprise non-part areas where the powder is not to be solidified. Non-part areas may receive no liquid functional agent, or they may receive a detailing agent that can be selectively applied around part contours, for example, to cool the surrounding build material and keep it from fusing.

In some example powder-based and fusing agent 3D printing systems, powdered build material layers can be spread over a platform or print bed within a build area. As noted above, a liquid functional agent (i.e., a fusing agent) can be selectively applied to (i.e., printed onto) each build material layer in areas where the particles of powdered material are to be fused together or solidified to form a part layer and/or a sacrificial part layer as defined by each 2D slice of a 3D object model. Each build material layer in the build area can be exposed to a fusing energy to thermally fuse together and solidify particles of powdered material where a part layer or part layers have been defined by the application of the fusing agent. This process can be repeated, one build material layer at a time, until a 3D part or 3D parts have been formed from fused part layers within a build volume of the build area. In some examples, this process includes forming a sacrificial part or multiple sacrificial parts.

Some of the material properties of 3D printed parts can depend on different processing parameters. For example, the temperature at which each layer of a 3D part is fused can impact the material properties of the 3D part. Some material properties that can be affected by the fusing process temperature include, for example, the part strength (e.g., tensile strength, modulus of elasticity, elongation at break, or impact strength), the cosmetic appearance of the part (e.g., color, surface texture, gloss), and the dimensional accuracy of the part. In different production circumstances, there may be an interest in controlling one material property more than another within the same print job or build volume. For example, in a first group of parts being printed in a print job, a user may want the parts to have high part strength, while in a second group of parts being printed within the same print job, the user may want the parts to have improved cosmetic appearance. Furthermore, in some circumstances it may be desirable to print a single part that has a number of different material properties throughout the part. Further still, in some circumstances, it may be desirable to print a group of parts in the same print job where some of the parts have a particular material property, while some of the other parts each have a number of different material properties.

The accuracy and quality of some material properties can depend in part on the ability to accurately control the fusing temperature of each part layer during the 3D printing process. Inaccurate and/or non-uniform fusing temperatures can cause defects in parts and undesirable variations among parts within a given build, including part warpage and inaccuracies in the dimensions and material properties of the part. When the fusing temperature of a part layer is too high, for example, the perimeter of the printed part area can "bleed" into the surrounding build material, which can result in inaccuracies in the geometry, dimensions, and/or appearance of the part. Additionally, when the fusing temperature of a layer becomes too high, the increased heat can adversely impact the subsequent layer of build material by causing uncontrolled fusing between part layers. If the fusing temperatures are not high enough, however, other material properties can be deficient, such as certain mechanical properties including ultimate tensile strength, elongation at break, and impact strength, for example.

Accordingly, example methods and systems described herein provide a simplified fusing process that enables layer-by-layer control of various material properties of 3D parts such as mechanical properties, cosmetic properties, and dimensional properties. Methods and systems provide control over the fusing temperature of each part layer within a build material layer, by enabling adjustments to the level of fusing power applied to part layers, for example, from a platform-wide (i.e., print bed-wide) scanning thermal energy source that passes over the build material layers. Because different fusing temperatures can be associated with different material properties, target fusing temperatures can be applied to part layers on a layer-by-layer basis so that the fusing process generates desired properties within the part. Target fusing temperatures can be achieved within part layers by adjusting the level of fusing power applied from a thermal energy source onto the part layers. In one example, fusing power can be increased or decreased to achieve target fusing temperatures within part layers based on comparisons of the target fusing temperatures with sensed temperatures taken from a sacrificial part layer. A sacrificial part is a part that is intentionally generated during the printing of other 3D parts as a way of providing a consistent and repeatable feature upon which thermal measurements can be made, as discussed below. A sacrificial part is generally intended to be discarded once it is complete. Fusing power can be adjusted from one build material layer to another, in a layer-by-layer, or inter-layer fashion. Fusing power can also be adjusted "on-the-fly", within or across a single build material layer, in an intra-layer fashion.

Material properties can be controlled within single parts and among groups of parts. For example, material properties can be controlled within a single part so that they vary throughout the part, or so they remain consistent throughout the part. Material properties can be controlled for groups of parts to be printed within a build volume so that parts formed in different volume areas of the build volume can have different material properties. Because the fusing power can be adjusted between successive build material layers as well as across a single build material layer, as noted above, material property control can be applied to parts that are to be formed above or below one another (i.e., vertically) within a build volume, as well as to parts that are to be formed next to one another (i.e., horizontally) within a build volume. For example, fusing power levels can be adjusted and applied across a single or same build material layer so that part layers from different parts that are horizontally adjacent to one another across the same build material layer can be fused at different fusing temperatures.

In different examples, material properties of parts can be selected and controlled in different ways and/or at different levels of granularity. In some examples, different print modes can be selected that define the material properties of a part or parts. For example, a print mode may define a single material property for an entire part. Another print mode may define a first material property for some specific layers within a part, and it may define a second material property for other specific layers within the part. Another print mode may define a material property profile that defines a variety of material properties throughout a part. In some examples, specific material properties can be selected and applied to parts and/or layers of parts. Material properties, however they are selected or defined, can be associated with target fusing temperatures that can be applied to part layers to generate the material properties. In some examples, specific target fusing temperatures can be selected and applied to parts and/or layers of parts.

In a particular example, a method of fusing layers of 3D parts includes forming a layer of build material, and selectively applying a liquid agent onto the layer of build material to define a part layer of a 3D part and a sacrificial layer of a sacrificial part. The method includes, in a single pass of a thermal energy source over the layer of build material, applying fusing energy to the sacrificial layer, sensing a temperature of the sacrificial layer, adjusting a power level of the thermal energy source based on the sensed temperature, and applying fusing energy to the part layer with the adjusted power level of the thermal energy source.

In another example, a 3D printing system for fusing layers of 3D parts includes a dispensing assembly to spread a layer of build material over a build surface and to dispense a fusing agent onto the layer of build material. The fusing agent defines a sacrificial layer and a part layer on the layer of build material. The system also includes a thermal energy source that is to heat the sacrificial layer at a first power level and to heat the first part layer at a second power level that may be different from the first power level. The thermal energy source is to heat the sacrificial layer and the part layer in a single pass over the layer of build material.

In another example, a method of fusing layers of 3D parts in a 3D printing system includes accessing 2D data slices of a 3D object model. Each 2D data slice defines a part layer of a 3D part and a sacrificial layer of a sacrificial part. The method includes forming layers of build material. For each layer of build material, the method also includes selectively applying a fusing agent onto the layer of build material to define a part layer and a sacrificial layer, heating the sacrificial layer with a thermal energy source, adjusting a power level of the thermal energy source based on a material property associated with the part layer, and heating the part layer with the adjusted power level of the thermal energy source.

Figure 1:
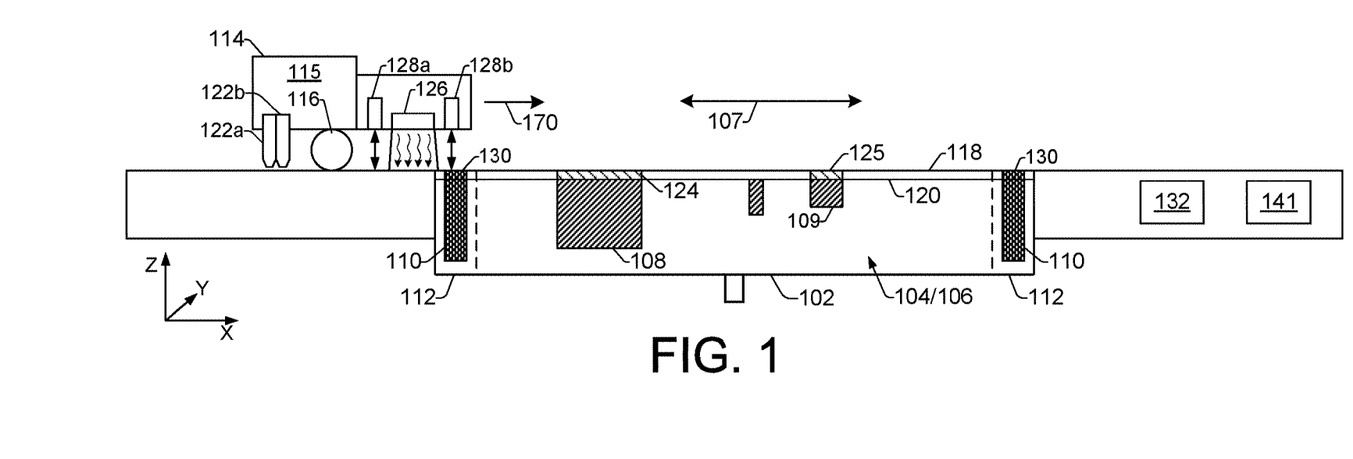
FIG. 1 shows a block diagram of an example 3D printing system suitable for providing fusing process control that enables layer-by-layer control of material properties of 3D parts.

FIG. 1 shows a block diagram of an example 3D printing system 100 suitable for providing fusing process control that enables layer-by-layer control of material properties of 3D parts. The 3D printing system 100 is shown by way of example and is not intended to represent a complete 3D printing system. Thus, it is understood that an example system 100 may comprise additional components and may perform additional functions not specifically illustrated or discussed herein.

Figure 3:
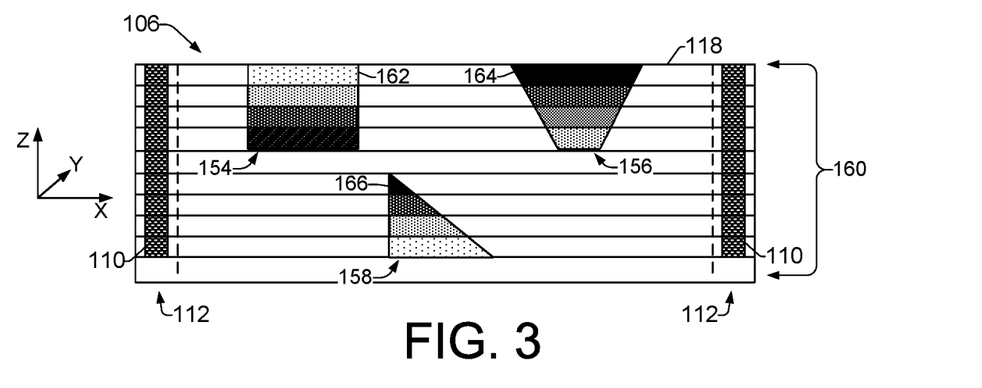
FIG. 3 shows an example of multiple build material layers forming a material build volume that includes example 3D printed parts formed in the build volume.

An example 3D printing system 100 includes a moveable print bed 102, or build platform 102 to serve as the floor to a work space or build area 104 in which 3D objects can be printed. In some examples the print bed 102 can move in a vertical direction (i.e., up and down) in the z-axis direction. The build area 104 of a 3D printing system generally refers to a volumetric work space that develops above the moveable print bed 102 as the print bed moves vertically downward during the layer-by-layer 3D printing and solidification process. During this process, build material layers such as build material layer 118, can be successively spread over the bed 102 and processed to form 3D parts. As more and more build material layers are processed within the build area 104, a volume of build material develops in which 3D printed parts have been formed. For the sake of clarity, a single build material layer 118 is identified in FIG. 1, although it is understood that multiple build material layers are present below the identified build material layer 118, the multiple build material layers forming a build volume 106. FIG. 3 shows an example of multiple build material layers 160 forming a material build volume 106 that includes example 3D printed parts 154, 156, 158, that have been formed in the build volume 106. The build volume 106 of FIG. 3 also shows examples of sacrificial parts 110 that are formed within the border area 112 of the build volume 106, as discussed in greater detail herein below.

As shown in FIG. 1, an example 3D printing system 100 can also include a dispensing assembly 114, a thermal energy source 126, and thermal sensors 128 (illustrated as sensors 128a, 128b). The dispensing assembly 114, thermal energy source 126, and thermal sensors 128 can travel together or separately over the build area 104 on a carriage (not shown), for example, bi-directionally in the x-axis. Dispensing assembly 114 can include a build material supply 115 and a build material spreader 116 to dispense and spread a build material layer 118 onto a build surface 120. When the first build material layer 118 of a print job is being dispensed, the build surface 120 is the print bed 102. Thereafter, however, the build surface 120 is a previously formed build material layer. The build material spreader 116 can comprise a powder spreading mechanism such as a roller or blade to move across the print bed 102 in the x-axis direction to spread a dispensed pile of powdered build material into a build material layer 118 over the build surface 120. As noted above, build materials can comprise different forms of materials and different types of materials. In some examples, a suitable build material can include PA12 build material commercially known as V1R10A "HP PA12" available from HP Inc.

The dispensing assembly 114 can additionally include a liquid agent dispenser 122 (illustrated as dispensers 122a and 122b), that can deliver a liquid functional agent such as a fusing agent and/or detailing agent. A fusing agent dispenser 122a can deliver a fusing agent in a selective manner onto areas of a build material layer 118. The fusing agent deposited onto areas of the build material layer 118 defines those areas as part layers, such as part layers 124 and 125, to be fused and solidified into 3D parts such as parts 108 and 109. A suitable fusing agent can include, for example, an ink-type formulation comprising carbon black, such as the fusing agent formulation commercially known as V1Q60Q "HP fusing agent" available from HP Inc. In different examples, fusing agent formulations can also comprise an infra-red light absorber, a near infra-red light absorber, a visible light absorber, and a UV light absorber. Inks comprising visible light enhancers can include dye based colored ink and pigment based colored ink, such as inks commercially known as CE039A and CE042A available from HP Inc. A detailing agent dispenser 122b can deliver a detailing agent onto selective areas of a build material layer, such as on and around part contours in order to cool the surrounding build material and prevent it from fusing into the part. An example of a suitable detailing agent can include a formulation commercially known as V1Q61A "HP detailing agent" available from HP Inc.

A liquid agent dispenser 122 (i.e., dispensers 122a and 122b) can be implemented, for example, as a printhead or printheads such as thermal inkjet or piezoelectric inkjet printheads. In some examples, a printhead liquid agent dispenser 122 can comprise a print bed-wide array of liquid ejectors (i.e., nozzles, not shown) that spans across the full y-axis dimension of the print bed 102. A print bed-wide liquid agent dispenser can move bi-directionally (i.e., back and forth) in the x-axis as indicated by direction arrow 107 while it ejects liquid droplets onto a build material layer 118. In other examples, a printhead dispenser 122 can comprise a scanning type printhead. A scanning type printhead can span across a limited portion or swath of the print bed 102 in the y-axis dimension as it moves bi-directionally in the x-axis as indicated by direction arrow 107, while ejecting liquid droplets onto a build material layer 118. Upon completing each swath, a scanning type printhead can move in the y-axis direction in preparation for printing liquid agent onto another swath of the build material layer 118.

The example 3D printing system 100 can also include a thermal energy source 126, such as radiation source 126, that can apply radiation to powdered build material layers on the print bed 102. Radiation from the thermal energy source 126 facilitates the heating and fusing of part layers, such as part layers 124 and 125, that have been defined through the deposition of fusing agent onto the build material layer 118. In some examples, the thermal energy source 126 can comprise a print bed-wide scanning energy source that scans across the print bed 102 bi-directionally in the x-axis, while covering the full width of the print bed 102 in the y-axis.

Figure 2:
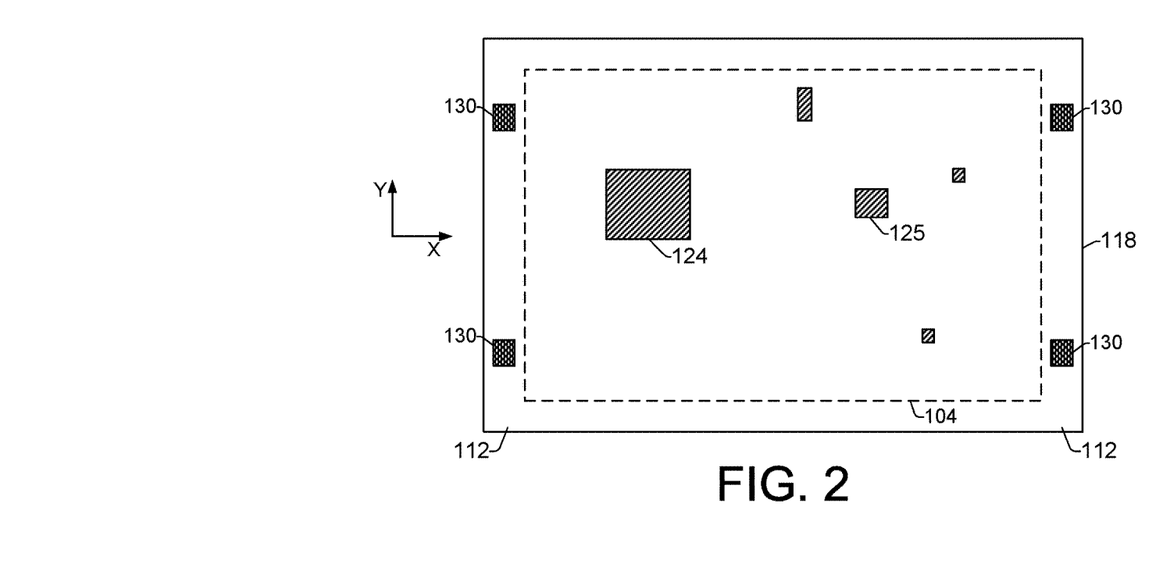
FIG. 2 shows a top down view of an example build material layer on which fusing agent has been deposited to define part layers and sacrificial part layers.

The example system 100 can also include a thermal sensor 128 (illustrated as sensors 128a, 128b), such as a thermal imaging camera, for example. A thermal sensor 128 can sense the surface temperature of a build material layer 118. This can include sensing the temperature of a sacrificial part layer 130 formed within the border area 112 or elsewhere within a build material layer 118, and sensing the temperature of a part layer 124, 125, formed within the build material layer 118, as shown in FIG. 2. FIG. 2 shows a top down view of an example build material layer 118 on which fusing agent has been deposited to define part layers such as part layers 124 and 125, and sacrificial part layers 130 of the sacrificial parts 110. The border area 112 generally provides a thermal boundary around the build area 104 to insulate 3D parts being formed within the build area 104. In some examples sacrificial parts 110 can be formed in the border area 112 to provide full use of the build area 104 for forming other 3D parts. However, in other examples sacrificial parts 110 can be disposed in any predetermined position within the build area 104 and/or border area 112. A sacrificial part 110 is generally intended to be discarded once it is complete, and it can be generated during the printing of other 3D parts in order to provide a consistent repeatable feature upon which thermal measurements by a thermal sensor 128 can be made and thermal feedback provided, as discussed below. A sacrificial layer 130 of a sacrificial part 110 can be of any size, shape, and position in a build material layer 118 that comprises an effective area suitable for sensing by a thermal sensor 128. In some examples, a sacrificial layer 130 comprises an area that is viewed by at least one camera pixel of a thermal camera sensor 128 capable of sensing surface temperature of an area as large or larger than the camera pixel size. In some examples, a thermal camera sensor can have a camera pixel size on the order of 10 mm×10 mm. In some examples, a sacrificial layer 130 can have an effective area of several camera pixels.

Referring generally to FIGS. 1 and 2, a thermal sensor 128 can be provided on both sides of the thermal energy source 126. In addition, sacrificial parts 110 can be formed within the border area 112 on both ends of a build area 104 as shown in FIG. 2. This enables the temperature of a sacrificial part layer 130 to be sensed directly after it has been heated by the thermal energy source 126 as the energy source 126 passes over the build material layer 118 in either direction along the x-axis (i.e., left to right or right to left in FIG. 2). As discussed in more detail below, the sensed temperature of a sacrificial layer 130 can be compared to target fusing temperatures of part layers, such as part layers 124, 125. Such comparisons allow for power level adjustments to be made in the thermal energy source 126, on-the-fly, as the thermal energy source 126 traverses past the sacrificial part layer 130 and continues over the part layers 124, 125. Thus, the thermal energy source 126 can provide dynamic power adjustment during continuous movement over build material layers. Adjusting the power level of the thermal energy source 126 can provide control over the fusing temperature of the part layers 124, 125, to achieve the appropriate target fusing temperatures and associated material properties within the part layers.

Figure 4:
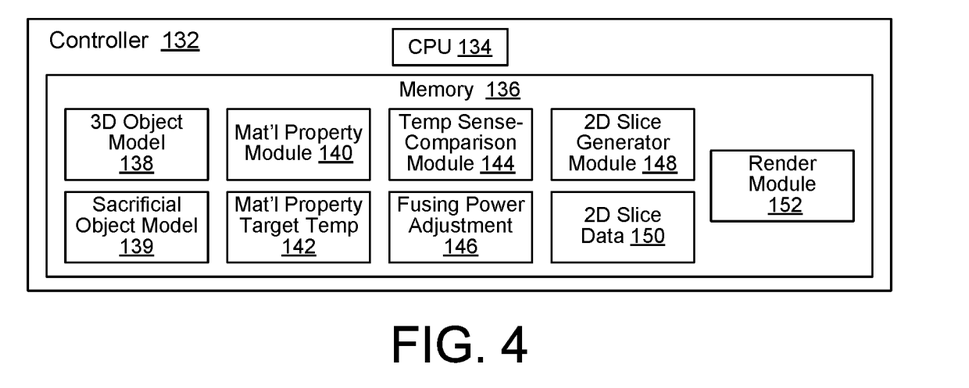
FIG. 4 shows an example controller with details illustrating some components stored in a memory to enable control over operations of the 3D printing system.

Referring to FIGS. 1 and 4, an example 3D printing system 100 additionally includes an example controller 132. FIG. 4 shows an example controller 132 with details illustrating some components stored in a memory to enable control over operations of the 3D printing system 100. For example, the controller 132 can control various components and operations of the 3D printing system 100 to facilitate the printing of 3D parts as generally described herein, such as controllably spreading a powder build material layer onto the print bed 102, selectively applying/printing fusing agent and detailing agent onto portions of the build material layer, and exposing the build material layer to radiation from a thermal energy source. In addition, the controller 132 can control temperature sensors 128 and determine differences between sensed temperatures of sacrificial part layers 130 and target fusing temperatures of other 3D part layers. The controller 132 can make corresponding adjustments to the power level of a thermal energy source 126 based on those differences. Adjusting the power level of the thermal energy source 126 enables the controller 132 to control each 3D part layer at a predetermined target fusing temperature, on a layer-by-layer basis. Target fusing temperatures can therefore be set for each part layer in order to achieve desired, user-selectable material properties associated with such target fusing temperatures on a layer-by-layer basis for each 3D part.

As shown in FIG. 4, an example controller 132 can include a processor (CPU) 134 and a memory 136. The controller 132 may additionally include other electronics (not shown) for communicating with and controlling various components of the 3D printing system 100. Such other electronics can include, for example, discrete electronic components and/or an ASIC (application specific integrated circuit). Memory 136 can include both volatile (i.e., RAM) and nonvolatile memory components (e.g., ROM, hard disk, optical disc, CD-ROM, flash memory, etc.). The components of memory 136 comprise non-transitory, machine-readable (e.g., computer/processor-readable) media that can provide for the storage of machine-readable coded program instructions, data structures, program instruction modules, JDF (job definition format), plain text or binary data in various 3D file formats such as STL, VRML, OBJ, FBX, COLLADA, 3MF, and other data and/or instructions executable by a processor 134 of the 3D printing system 100.

As shown in the example controller 132 of FIG. 4, an example of executable instructions to be stored in memory 136 can include instructions associated with modules 140, 144, 146, 148, and 152, while an example of stored data can include 3D object model data 138, sacrificial object model data 139, a material property and target fusing temperature look-up table (LUT) 142, and 2D slice data 150. Thus, a 3D printing system 100 can receive a 3D object model 138 that represents a part to be printed and a sacrificial object model 139 that represents a sacrificial part to be printed. The object models 138, 139, can be received in a 3D file format such as 3MF, for example. The object models 138, 139, can include geometric information that describes the respective shapes of the 3D model and sacrificial model, as well as information indicating colors, surface textures, build material types, the positions for printing the 3D part and sacrificial part within the build volume 106, and so on. In some examples, information about the 3D part and sacrificial part, such as the part positions and material types, can be received independently from the respective object models 138, 139, such as from user input or otherwise, and stored in memory 136.

In some examples, 3D object model 138 and sacrificial object model 139 can be processed into 2D slice data 150 for printing. The processor 134 can execute instructions from a 2D slice generator module 148, for example, to generate the 2D slice data 150. The processor 134 can determine, as discussed in detail below, a target fusing temperature for each part layer to be formed from the 3D object model 138, and incorporate the target fusing temperatures into the 2D slice data 150 so that each part layer is processed at an appropriate target fusing temperature associated with a specified material property. The processor 134 can then further execute instructions from the render module 152 to generate 3D print system commands that can control the operation of components of the 3D printing system 100 in order to print layers of a 3D part corresponding with the 2D slice data 150.

In some examples, controller 132 can execute instructions from a material property module 140 to obtain material properties associated with the 3D object model 138. The material properties can be obtained in different ways, for example, by retrieving material property specifications provided within the 3D object model, or by receiving material property specifications as user input through a user interface 141 (FIG. 1) of the 3D printing system 100. In different examples, material properties can be selectable and input by a user in different ways. For example, a user interface 141 may provide a range of material properties selectable by a user to be applied to different layers of a part. Thus, in some examples a user can select a desired material property for each layer of a part. In some examples, a user interface 141 may provide different print modes that define different material property profiles for the layers of a part. Thus, in some examples, a user can select a print mode that defines outer layers of a part to have greater cosmetic properties, while defining inner layers of a part to have greater tensile strength. In these cases, the specified material property for each part layer can be converted into an associated target fusing temperature at which to process the part layer to achieve the specified material properties. However, in other examples, a user interface 141 may enable a user to enter a precise target fusing temperature for each layer of a part.

In some examples, material properties can be specified to vary with each single part layer. In some examples, material properties can be specified for application to multiple part layers that make up larger sections of a part, or even a whole part. Thus, sections of a part, or a whole part, can comprise a same material property. Examples of different types of material properties that can be specified for part layers include, but are not limited to, the strength of each part layer (e.g., tensile strength, modulus of elasticity, elongation at break, or impact strength), the cosmetic appearance of each part layer (e.g., color, surface texture, gloss), the dimensional accuracy of each part layer, combinations thereof, and so on.

Referring again to FIG. 3, the example build volume 106 shows examples of 3D printed parts 154, 156, and 158, formed therein as a result of different material properties as specified above. The build material layers 160 as shown in the build volume 106 are intended to illustrate in different examples, either single/individual build material layers or multiple build material layers. The part layers for parts 154, 156, and 158, comprise different material properties that have been specified, for example, as noted above. The build material layers 160 are intended for the purpose of illustration and are not intended to indicate the actual thickness of a single layer or multiple layers. Thus, a part layer 162 (or group of multiple part layers 162) of a 3D part 154 can have a first material property, such as a glossy cosmetic appearance, while a part layer 164 (or group of multiple part layers 164) of a horizontally adjacent 3D part 156 (i.e., adjacent in the x-axis) can have a second material property, such as a high tensile strength. Likewise, a part layer 162 (or group of multiple part layers 162) of a 3D part 154 can have a first material property, such as a glossy cosmetic appearance, while a part layer 166 (or group of multiple part layers 166) of a vertically adjacent 3D part 158 (i.e., adjacent in the z-axis) can have a second material property, such as a high tensile strength. Thus, FIG. 3 illustrates that within a given build material layer such as layer 118, multiple adjacent part layers (e.g., part layers 162, 164) can be processed at different target fusing temperatures so that they have different material properties. This demonstrates how a thermal energy source 126 can provide adjusted power levels as it moves horizontally across a given build material layer. FIG. 3 also illustrates that multiple part layers (e.g., part layers 162, 166) disposed on different build material layers 160 within a build volume 106 can also be processed at different target fusing temperatures so that they have different material properties.

Figure 5:
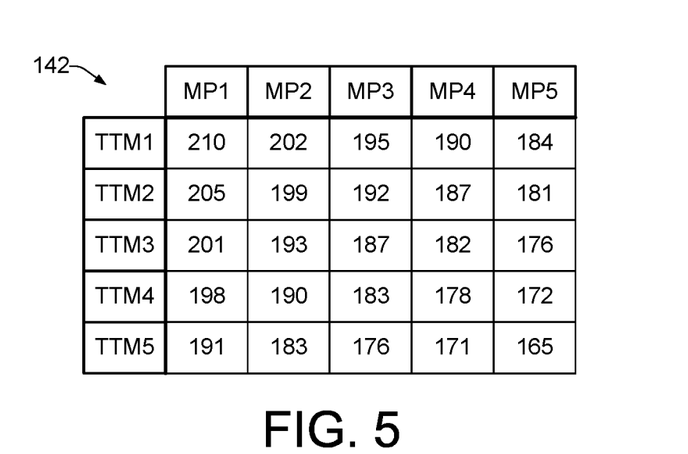
FIG. 5 shows an example look-up table that associates target fusing temperatures with different material properties and different material types.

Controlling or generating a 3D part layer to have the appropriate specified material property involves processing the part layer at an appropriate target fusing temperature. Referring again to the example controller 132 of FIG. 4, controller 132 can determine target fusing temperatures for each layer of a 3D part from specified material properties by using target temperature module 142. In some examples, module 142 can comprise data in a look-up table (LUT) 142 as shown in FIG. 5, that associates target fusing temperatures with different material properties and different material types. In the example LUT 142 in FIG. 5, five example material properties (MP1-MP5) are shown. For each material property, a number of target fusing temperatures are possible, depending on the type of material being used to generate the 3D part. Thus, from the example LUT 142 in FIG. 5, after the controller 132 obtains specified material properties for each part layer of a 3D part, the controller 132 can determine for each part layer, an associated target fusing temperature for a given material type (i.e., TTM1-TTM5).

Referring generally to FIGS. 1-4, target fusing temperatures can be generated within part layers during a 3D printing process by adjusting the level of fusing power applied to the part layers from a thermal energy source 126. The controller 132, executing instructions from a temperature sensing-comparison module 144, can control a thermal sensor 128 (illustrated as sensors 128a, 128b) to sense the temperature of a sacrificial layer 130 at an appropriate time. For example, as shown in FIG. 1, thermal energy source 126 and thermal sensors 128a, 128b, can pass from left to right in the direction of arrow 170. The thermal energy source 126 can apply thermal energy to heat and fuse a sacrificial layer 130 (at the left side of build area 104) within a border area 112 as it passes over the sacrificial layer 130. The thermal sensor 128a trailing behind the thermal energy source 126 as it moves in the direction of arrow 170, can be controlled to sense the temperature of the sacrificial layer 130. The controller 132 can compare the sensed temperature of the sacrificial layer 130 with a target fusing temperature of the upcoming part layer 124 of 3D part 108. The controller 132, executing instructions from a fusing power adjustment module 146, can increase or decrease the level of power of the thermal energy source 126 depending on whether the sensed temperature is lower than the target fusing temperature or higher than the target fusing temperature. For example, if the sensed temperature of the sacrificial layer 130 is lower than the target fusing temperature determined for part layer 124, the controller 132 can determine a higher power level to achieve the target fusing temperature in the part layer 124, and can increase the power level to the thermal energy source 126 accordingly. Thus, as the thermal energy source 126 passes over the part layer 124, the increased amount of thermal energy from the source 126 can generate the appropriate target fusing temperature within the part layer 124 to achieve the specified material property for the part layer 124. Similarly, if the sensed temperature of the sacrificial layer 130 is higher than the target fusing temperature determined for part layer 124, the controller 132 can determine a lower power level to achieve the target fusing temperature in the part layer 124, and can decrease the power level to the thermal energy source 126 accordingly. As the thermal energy source 126 passes over the part layer 124, the decreased amount of thermal energy from the source 126 can generate the appropriate target fusing temperature within the part layer 124 to achieve the specified material property for the part layer 124.

Target fusing temperatures of additional part layers within a same build material layer, such as part layer 125 in build material layer 118 of FIG. 1, can be achieved in a similar manner as noted above. For example, the sensed temperature from the sacrificial layer 130 can also be compared to the target fusing temperature determined for the part layer 125. After the thermal energy source 126 passes over and fuses part layer 124 at the target fusing temperature for part layer 124, the controller 132 can further adjust the power level of the thermal energy source 126 based on a comparison of the sensed temperature of sacrificial layer 130 to the target fusing temperature of part layer 125, and apply that adjusted power level when passing over part layer 125. In an alternate or additional example, controller 132 can control the thermal sensor 128a to sense the temperature of the part layer 124 after the thermal energy source 126 passes over part layer 124. The controller 132 can compare the sensed temperature of part layer 124 with the target fusing temperature of part layer 125, and adjust the power level of the thermal energy source 126 accordingly to a level that will achieve the appropriate target fusing temperature for part layer 125.

In a similar manner as noted above, the thermal energy source 126 and thermal sensors 128a, 128b, can pass in the opposite direction, from right to left over a build material layer 118. The thermal energy source 126 can apply thermal energy to heat and fuse a sacrificial layer 130 (at the right side of build area 104) within a border area 112 as it passes over the sacrificial layer 130. The other thermal sensor 128b trailing behind the thermal energy source 126 as it moves opposite the direction of arrow 170, can be controlled to sense the temperature of the of the sacrificial layer 130. The controller 132 can compare the sensed temperature of the sacrificial layer 130 with a target fusing temperature of the upcoming part layer 125 of 3D part 109, and adjust the power level of the thermal energy source 126 as noted above to generate the target fusing temperature in part layer 125.

Figure 6:
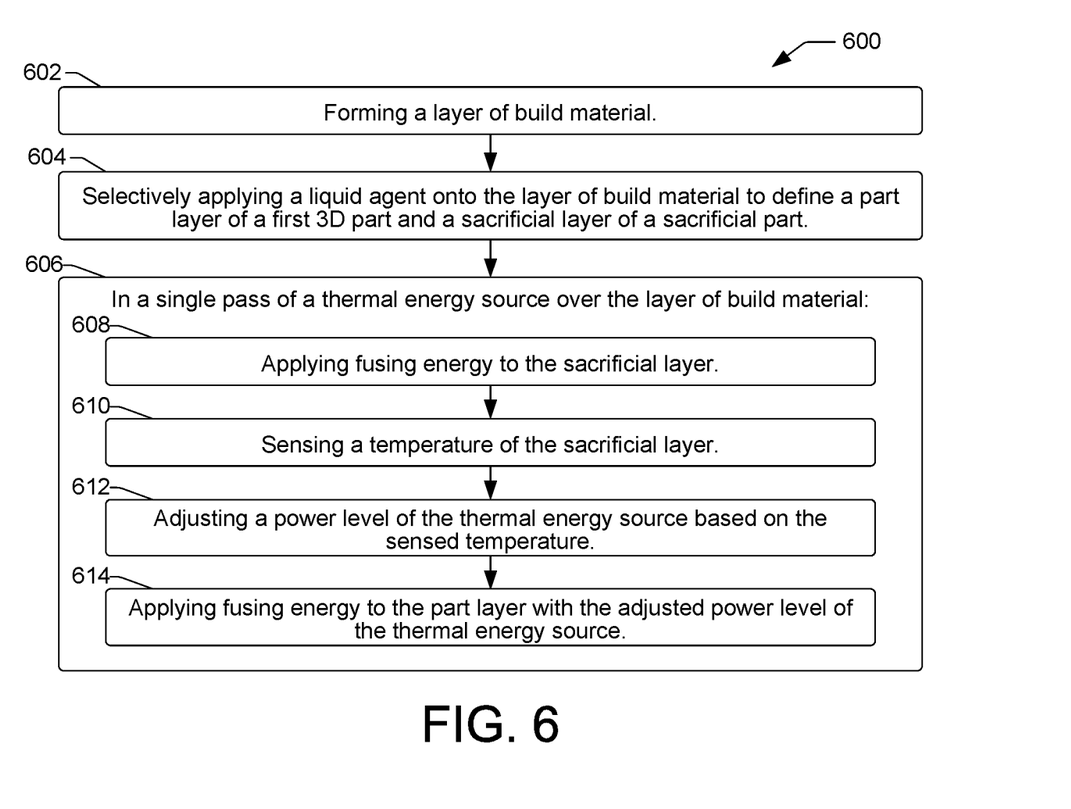
FIG. 6 is a flow diagram showing an example method of fusing layers of 3D parts.
Figure 7A:
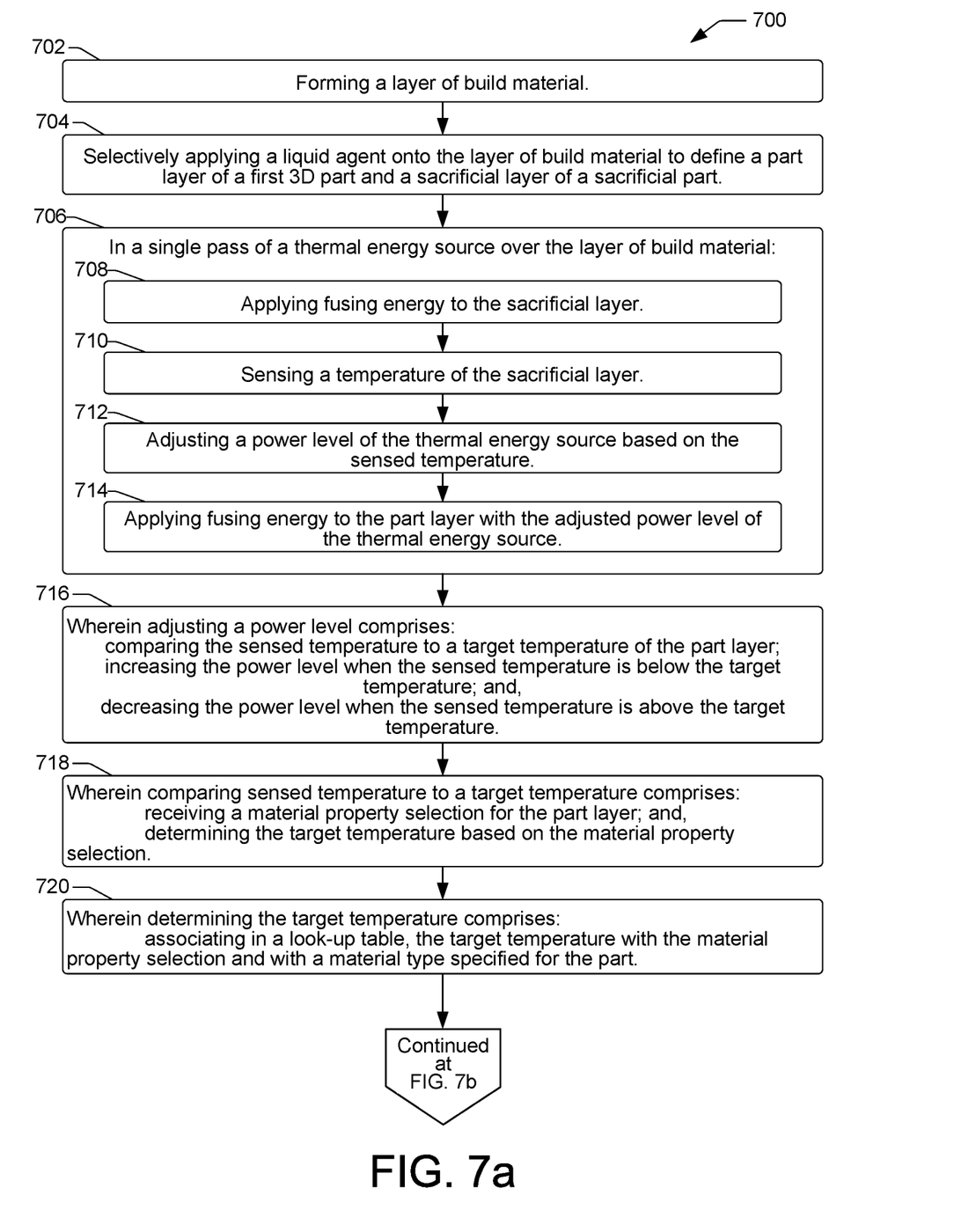
FIG. 7a is a flow diagram showing an example method of fusing layers of 3D parts.
Figure 7B:
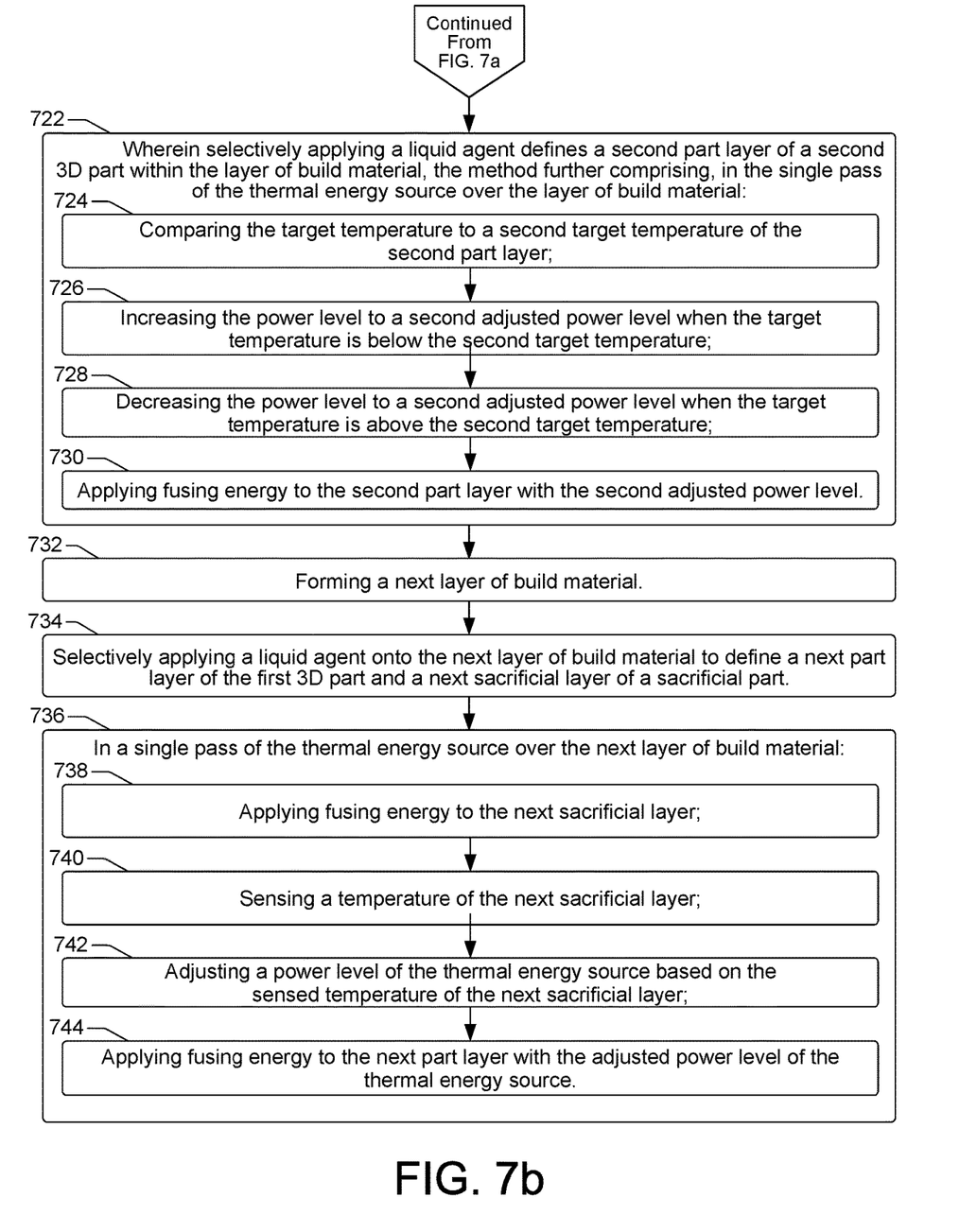
FIG. 7b is a flow diagram showing additional operations of the example method of fusing layers of 3D parts of FIG. 7a; and, FIG. 8 is a flow diagram showing an example method of fusing layers of 3D parts.

FIGS. 6, 7 (7a, 7b) and 8 are flow diagrams showing example methods 600, 700 and 800, of fusing layers of 3D parts. Method 700 comprises extensions of method 600 and incorporates additional details of method 600. Methods 600, 700 and 800 are associated with examples discussed above with regard to FIGS. 1-5, and details of the operations shown in methods 600, 700 and 800 can be found in the related discussion of such examples. The operations of methods 600, 700 and 800 may be embodied as programming instructions stored on a non-transitory, machine-readable (e.g., computer/processor-readable) medium, such as memory/storage 136 shown in FIG. 4. In some examples, implementing the operations of methods 600, 700 and 800 can be achieved by a controller, such as a controller 132 of FIG. 4, reading and executing the programming instructions stored in a memory 136. In some examples, implementing the operations of methods 600, 700 and 800 can be achieved using an ASIC and/or other hardware components alone or in combination with programming instructions executable by a controller 132.

Figure 8:
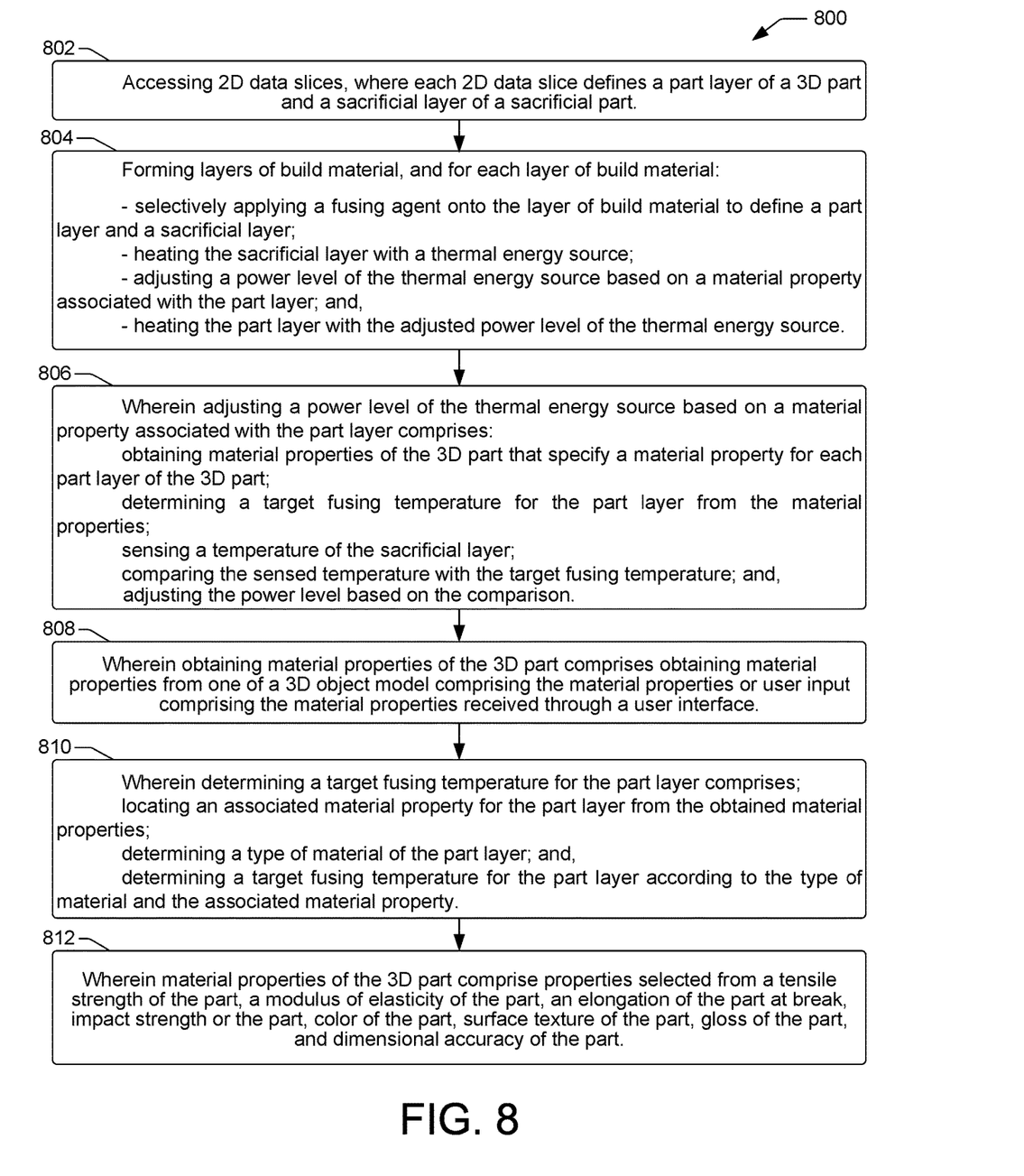

The methods 600, 700 and 800 may include more than one implementation, and different implementations of methods 600, 700 and 800 may not employ every operation presented in the respective flow diagrams of FIGS. 6, 7 and 8. Therefore, while the operations of methods 600, 700 and 800 are presented in a particular order within their respective flow diagrams, the order of their presentations is not intended to be a limitation as to the order in which the operations may actually be implemented, or as to whether all of the operations may be implemented. For example, one implementation of method 700 might be achieved through the performance of a number of initial operations, without performing other subsequent operations, while another implementation of method 700 might be achieved through the performance of all of the operations.

Referring now to the flow diagram of FIG. 6, an example method 600 of fusing layers of 3D parts begins at block 602 with forming a layer of build material. As shown at block 604, method 600 can also include selectively applying a liquid agent onto the layer of build material to define a part layer of a first 3D part and a sacrificial layer of a sacrificial part. As shown at block 606, in a single pass of a thermal energy source over the layer of build material, the method 600 can include applying fusing energy to the sacrificial layer (block 608), sensing a temperature of the sacrificial layer (block 610), adjusting a power level of the thermal energy source based on the sensed temperature (block 612), and applying fusing energy to the part layer with the adjusted power level of the thermal energy source (block 614).

Referring now to the flow diagram of FIG. 7a, another example method 700 of fusing layers of 3D parts is shown. Method 700 comprises extensions of method 600 and incorporates additional details of method 600. Accordingly, method 700 begins at block 702 with forming a layer of build material. As shown at block 704, method 700 can include selectively applying a liquid agent onto the layer of build material to define a part layer of a first 3D part and a sacrificial layer of a sacrificial part. In a single pass of a thermal energy source over the layer of build material, as shown at block 706, the method 700 can include applying fusing energy to the), adjusting a power level of the thermal energy source based on the sensed temperature (block 712), and applying fusing energy to the part layer with the adjusted power level of the thermal energy source (block 714). In some examples, as shown at block 716, adjusting a power level can include comparing the sensed temperature to a target temperature of the part layer, increasing the power level when the sensed temperature is below the target temperature, and decreasing the power level when the sensed temperature is above the target temperature. In some examples of method 700, as shown at block 718, comparing the sensed temperature to a target temperature of the part layer can include receiving a material property selection for the part layer, and determining the target temperature based on the material property selection. In some examples of method 700, as shown at block 720, determining the target temperature can include associating in a look-up table, the target temperature with the material property selection and with a material type specified for the part.

The method 700 continues from FIG. 7a to FIG. 7b, where as shown at block 722, in some examples, selectively applying a liquid agent can define a second part layer of a second 3D part within the layer of build material, and the method can further include, within the single pass of the thermal energy source over the layer of build material, comparing the target temperature to a second target temperature of the second part layer (block 724), increasing the power level to a second adjusted power level when the target temperature is below the second target temperature (block 726), decreasing the power level to a second adjusted power level when the target temperature is above the second target temperature (block 728), and applying fusing energy to the second part layer with the second adjusted power level (block 730). The method 700 can continue as shown at blocks 732 and 734, with forming a next layer of build material, and selectively applying a liquid agent onto the next layer of build material to define a next part layer of the first 3D part and a next sacrificial layer of the sacrificial part. As shown at block 736, the method can include, in a single pass of the thermal energy source over the next layer of build material, applying fusing energy to the next sacrificial layer (block 738), sensing a temperature of the next sacrificial layer (block 740), adjusting a power level of the thermal energy source based on the sensed temperature of the next sacrificial layer (block 742), and applying fusing energy to the next part layer with the adjusted power level of the thermal energy source (block 744).

Referring now to the flow diagram of FIG. 8, another example method 800 of fusing layers of 3D parts is shown. As shown at block 802, the method 800 can include accessing 2D data slices, where each 2D data slice defines a part layer of a 3D part and a sacrificial layer of a sacrificial part. The method can include forming layers of build material as shown at block 804, and for each layer of build material, selectively applying a fusing agent onto the layer of build material to define a part layer and a sacrificial layer, heating the sacrificial layer with a thermal energy source, adjusting a power level of the thermal energy source based on a material property associated with the part layer, and heating the part layer with the adjusted power level of the thermal energy source. As shown at block 806, in some examples, adjusting a power level of the thermal energy source based on a material property associated with the part layer can include obtaining material properties of the 3D part that specify a material property for each part layer of the 3D part, determining from the material properties, a target fusing temperature for the part layer, sensing a temperature of the sacrificial layer, comparing the sensed temperature with the target fusing temperature, and adjusting the power level based on the comparison. As shown at block 808, in some examples, obtaining material properties of the 3D part can include obtaining material properties from one of a 3D object model comprising the material properties or user input comprising the material properties received through a user interface. As shown at block 810, in some examples, determining a target fusing temperature for the part layer can include locating an associated material property for the part layer from the obtained material properties, determining a type of material of the part layer, and determining a target fusing temperature for the part layer according to the type of material and the associated material property. As shown at block 812, in some examples, material properties of the 3D part can include properties selected from a tensile strength of the part, a modulus of elasticity of the part, an elongation of the part at break, impact strength or the part, color of the part, surface texture of the part, gloss of the part, and dimensional accuracy of the part.

What is claimed is:

1. A method of fusing layers of three-dimensional (3D) parts comprising:
    forming a layer of build material;
    selectively applying a liquid agent onto the layer of build material to define a part layer of a first 3D part being formed and a sacrificial layer of a sacrificial part being formed; and,
    in a single pass of a thermal energy source over the layer of build material:
        applying fusing energy to the sacrificial layer; then
        sensing a temperature of the sacrificial layer of the sacrificial part being formed;
        comparing the sensed temperature to a first target temperature of the part layer of the first 3D part being formed;
        adjusting a power level of the thermal energy source to a first adjusted power level based on the comparison of the sensed temperature; and,
        applying fusing energy to the part layer of the first 3D part being formed with the first adjusted power level of the thermal energy source.

2. The method as in claim 1, wherein adjusting a power level comprises:
    increasing the power level when the sensed temperature is below the first target temperature; and,
    decreasing the power level when the sensed temperature is above the first target temperature.

3. The method as in claim 2, wherein comparing the sensed temperature to a first target temperature of the part layer of the first 3D part being formed comprises:
    receiving a material property selection for the part layer of the first 3D part being formed;
    and, determining the first target temperature based on the material property selection.

4. The method as in claim 3, wherein determining the first target temperature comprises:
    associating in a look-up table, the first target temperature with the material property selection and with a material type specified for the part layer of the first 3D part being formed.

5. The method as in claim 2, wherein selectively applying a liquid agent defines a part layer of a second 3D part being formed within the layer of build material, the method further comprising:
    in the single pass of the thermal energy source over the layer of build material:
        comparing the sensed temperature to a second target temperature of the part layer of the second 3D part being formed;
        increasing the power level to a second adjusted power level when the sensed temperature is below the second target temperature;
        decreasing the power level to a second adjusted power level when the sensed temperature is above the second target temperature; and,
        applying fusing energy to the part layer of the second 3D part being formed with the second adjusted power level.

6. The method as in claim 1, further comprising:
    forming a next layer of build material;
    selectively applying a liquid agent onto the next layer of build material to define a next part layer of the first 3D part being formed and a next sacrificial layer of the sacrificial part being formed; and,
    in a single pass of the thermal energy source over the next layer of build material:
        applying fusing energy to the next sacrificial layer; then
        sensing a temperature of the next sacrificial layer of the sacrificial part being formed;
        comparing the sensed temperature to a first target temperature of the part layer of the first 3D part being formed;
        adjusting a power level of the thermal energy source based on the comparison of the sensed temperature of the next sacrificial layer; and,
        applying fusing energy to the next part layer of the first 3D part being formed with the adjusted power level of the thermal energy source.

7. A 3D printing system for fusing layers of 3D parts, comprising:
    a dispensing assembly to spread a layer of build material over a build surface and to dispense a fusing agent onto the layer of build material;
    a thermal energy source;
    a thermal sensor; and, a controller programmed to:
control the dispensing assembly to form a layer of build material;
control the dispensing assembly to selectively apply the fusing agent onto the layer of build material to define a part layer of a first 3D part being formed and a sacrificial layer of a sacrificial part being formed; and,
in a single pass of the thermal energy source over the layer of build material:
control the thermal energy source to apply fusing energy to the sacrificial layer; then
receive a temperature of the sacrificial layer of the sacrificial part being formed sensed by the thermal sensor;
compare the received temperature to a first target temperature of the part layer of the first 3D part being formed;
adjust a power level of the thermal energy source to a first adjusted power level based on the comparison of the sensed temperature; and,
control the thermal energy source to apply fusing energy to the part layer of the first 3D part being formed with the first adjusted power level.

8. The 3D printing system as in claim 7, wherein the controller programmed to adjust a power level to a first adjusted power level comprises the controller programmed to:
increase the power level when the sensed temperature is below the first target temperature; and,
decrease the power level when the sensed temperature is above the first target temperature.

9. The 3D printing system as in claim 8, wherein the controller is programmed to:
control the dispensing assembly to selectively apply the fusing agent to define a part layer of a second 3D part being formed within the layer of build material; and,
in the single pass of the thermal energy source over the layer of build material:
comparing the sensed temperature to a second target temperature of the part layer of the second 3D part being formed;
increasing the power level to a second adjusted power level when the sensed temperature is below the second target temperature;
decreasing the power level to a second adjusted power level when the sensed temperature is above the second target temperature; and,
applying fusing energy to the part layer of the second 3D part being formed with the second adjusted power level.

10. The 3D printing system as in claim 7, wherein the dispensing assembly comprises:
a build material spreading device to spread the layer of build material over the build surface; and,
a printhead to selectively deposit the fusing agent onto the layer of build material to define the sacrificial layer, and the part layer of the first 3D part being formed.

11. A method of fusing layers of three-dimensional (3D) parts comprising:
accessing 2D data slices, each 2D data slice defining a part layer of a 3D part being formed and a sacrificial layer of a sacrificial part being formed;
forming layers of build material, and for each layer of build material:
selectively applying a fusing agent onto the layer of build material to define a part layer and a sacrificial layer;
heating the sacrificial layer with a thermal energy source;
sensing a temperature of the heated sacrificial layer of the sacrificial part being formed;
comparing the sensed temperature to a first target fusing temperature of the part layer of the 3D part being formed;
adjusting a power level of the thermal energy source based on the comparison of the sensed temperature; and,
heating the part layer with the adjusted power level of the thermal energy source.

12. The method as in claim 11, wherein adjusting a power level of the thermal energy source comprises:
obtaining material properties of the 3D part being formed that specify a material property for each part layer of the 3D part being formed; and
determining from the material properties, a target fusing temperature for the part layer.

13. The method as in claim 12, wherein obtaining material properties of the 3D part being formed comprises obtaining material properties from one of a 3D object model comprising the material properties or user input comprising the material properties received through a user interface.

14. The method as in claim 12, wherein determining a target fusing temperature for the part layer comprises;
locating an associated material property for the part layer from the obtained material properties;
determining a type of material of the part layer; and,
determining a target fusing temperature for the part layer according to the type of material and the associated material property.

15. The method as in claim 12, wherein material properties of the 3D part being formed comprise properties selected from a tensile strength of the part, a modulus of elasticity of the part, an elongation of the part at break, impact strength or the part, color of the part, surface texture of the part, gloss of the part, and dimensional accuracy of the part.

* * * * *